United States Patent [19]

Haworth et al.

[11] Patent Number: 5,657,545
[45] Date of Patent: Aug. 19, 1997

[54] FIXTURE FOR IDENTIFYING PHASE ANGLE RELATIONSHIPS IN A STEERING SHAFT ASSEMBLY

[75] Inventors: John E. Haworth, Cridersville; Brad S. Jones, Waterville; James A. Lashaway, Bowling Green; Thomas J. Saba, Toledo; Carl A. Turnwald, Ft. Jennings; Dawhorng D. Wang, Perrysburg, all of Ohio

[73] Assignee: Dana Corporation, Toledo, Ohio

[21] Appl. No.: 568,598

[22] Filed: Dec. 5, 1995

[51] Int. Cl.⁶ ............................................... G01B 7/31
[52] U.S. Cl. .................. 33/1 N; 33/600; 33/603; 74/492; 464/23; 464/172
[58] Field of Search ................... 33/1 N, 1 PT, 33/534, 193, 600, 603, 606, 612, 613, 645, 655, 660, 661, 412; 74/492; 464/23, 172

[56] References Cited

U.S. PATENT DOCUMENTS

| | | |
|---|---|---|
| 1,982,363 | 11/1934 | Wheeler . |
| 2,810,274 | 10/1957 | Weasler ................... 464/23 |
| 2,839,902 | 6/1958 | Glover .................... 464/23 |
| 2,943,465 | 7/1960 | Musser .................... 464/23 |
| 3,024,629 | 3/1962 | Raskhodoff . |
| 3,387,465 | 6/1968 | Walker . |
| 3,500,976 | 3/1970 | Halley . |
| 3,587,250 | 6/1971 | Raskhodoff . |
| 3,945,221 | 3/1976 | Miokovic . |
| 5,025,563 | 6/1991 | Rennerfelt .............. 33/1 N |

Primary Examiner—Christopher W. Fulton
Attorney, Agent, or Firm—MacMillan, Sobanski & Todd

[57] ABSTRACT

A fixture for identifying the phase angle relationships between two universal joints secured to the ends of a steering shaft assembly includes first and second universal joint assemblies which are connected together by a shaft assembly. The shaft assembly includes a male splitted member which is secured to a first inboard yoke of the first universal joint assembly. The male splined member extends within and cooperates with a female splined member of the shaft assembly. The shaft assembly also includes a hollow cylindrical extension member having a first end which is secured to a second inboard yoke of the second universal joint assembly. The extension member has a second end which is journalled on a reduced diameter end portion of the female splined member. Thus, the extension member and the second universal joint can be rotated relative to the female splined member and the first universal joint assembly. A band is provided on the outer surface of the female splined member at the end adjacent to the reduced diameter portion and the extension member. The band has a series of indicia which are visible throughout the entire outer surface of the female splined member. A 0° reference point of the indicia is axially aligned with the first inboard yoke of the first universal joint assembly. A reference arrow is provided on the outer surface of the extension member at the end adjacent to the extension member. The reference arrow terminates in a point which is directly adjacent to the indicia. The reference arrow is axially aligned with the second inboard yoke of the second universal joint assembly. The indicia and the reference arrow cooperate to provide an indication of the phase angle between the first and second universal joint assemblies.

19 Claims, 2 Drawing Sheets

FIXTURE FOR IDENTIFYING PHASE ANGLE RELATIONSHIPS IN A STEERING SHAFT ASSEMBLY

BACKGROUND OF THE INVENTION

This invention relates in general to vehicle steering shaft assemblies having two or more universal joints connected together. More specifically, this invention relates to a fixture for clearly and uniformly identifying the phase angle relationship between two universal joints in such a vehicle steering shaft assembly.

In virtually every road and off-road vehicle in use today, a steering system is provided for permitting a driver to control the direction of movement. A typical steering system includes a steering wheel and column assembly, an intermediate steering shaft assembly, and a steering device. The steering wheel is rotatably supported within a driver compartment of the vehicle for movement by the driver. The steering shaft assembly is connected to the steering wheel for rotation therewith. The steering device is connected to the steering shaft assembly for turning the wheels of the vehicle in response to rotation of the steering wheel.

In many larger vehicles, such as tracks, the steering shaft assembly is often designed not only to provide a rotational driving connection between the steering wheel and the steering device, but also to permit relative axial movement therebetween. Such axial movement has been found to be advantageous for two reasons. First, a relatively small amount of such axial movement is desirable to accommodate vibrations, bumps, and other aspects of normal vehicle operation which would otherwise be transmitted to the steering wheel. Second, when the vehicle is serviced, a relatively large mount of such axial movement is desirable to permit the cab of the vehicle to be pivoted upwardly without requiring disassembly of the steering system.

To accomplish this, it is known to construct the steering shaft assembly from cooperating male and female splined telescoping steering shaft members. The first steering shaft member is connected to the steering wheel by a first universal joint, while the second steering shaft member is connected to the steering device by a second universal joint. The universal joints are provided to permit angular displacement between the rotational axes of the steering shaft members and, therefore, the steering wheel and steering device associated therewith. The splined connection between the first and second steering shaft members provides a rotatable driving connection between the steering wheel and the steering device, while permitting relative axial movement therebetween.

Generally, the universal joints used in steering shaft assemblies are Cardan type universal joints. A typical Cardan type universal joint includes a pair of yokes which are interconnected by a cross. The cross includes a central body portion having four cylindrical trunnions extending outwardly therefrom. The trunnions are oriented in a single plane and extend at right angles relative to one another. A hollow cylindrical beating cup having a closed end is mounted on the end of each of the trunnions. A plurality of bearings, such as roller bearings or needle bearings, are provided between the outer cylindrical surface of a given trunnion and the inner cylindrical surface of the associated bearing cup to permit relative rotational movement therebetween. To form a Cardan type universal joint, a first yoke is connected to a first opposed pair of the bearing cups of the cross, while a second yoke is connected to a second opposed pair of the bearing cups. In the context of a steering shaft assembly, therefore, the first universal joint includes a first yoke secured to the end of the first steering shaft member and connected to the bearing cups mounted on the first opposed pair of the trunnions. The bearing cups mounted on the second opposed pair of the trunnions are connected by a second yoke for rotation with the steering wheel. Similarly, the second universal joint of the steering shaft assembly includes a first yoke secured to the end of the second steering shaft member and connected to the bearing cups mounted on the first opposed pair of the trunnions. The bearing cups mounted on the second opposed pair of the trunnions are connected by a second yoke for rotation with the steering device.

It is known that whenever a Cardan type universal joint is operated while the rotational axes of the two yokes are not aligned, non-uniform motion is developed. In other words, when one yoke (the driving yoke) is rotated an incremental angular distance, the other yoke (the driven yoke) does not rotate the same incremental angular distance. Rather, the driven yoke rotates either more or less than the incremental angular distance, depending upon the initial angular orientation. Similarly, when the driving yoke is rotated at a constant rotational velocity, the driven yoke does not rotate at the same constant rotational velocity. Rather, the driven yoke rotates either faster or slower than the rotational velocity, again depending upon the initial angular orientation. It has been found that the incremental angular displacement and velocity of the driven yoke vary in a sinusoidal manner relative to the constant angular displacement and velocity of the driven yoke. Thus, although the average angular displacement and velocity over one complete revolution of the driving and driven yokes is uniform, the incremental angular displacement and velocity within a complete revolution are not.

The consequence of these sinusoidal variations in angular displacement and velocity in a vehicle steering system is that undesirable torsional vibrations may be generated in the steering shaft assembly when the steering wheel is rotated to effect a turn. These torsional vibrations can be somewhat annoying to a driver of the vehicle and, therefore, are undesirable. The magnitude of these torsional vibrations is proportional to the square oft he operating angle of the universal joint. In steering systems and other devices where multiple universal joints are connected in series, the effects of universal joints may be combined and expressed as a single equivalent operating angle. Thus, the magnitude of the torsional vibrations in a multiple universal joint system is proportional to the square of the equivalent operating angle of the system.

To a certain extent, the torsional vibrations in a multiple universal joint system can be minimized if the two universal joints connected to the steering shaft assembly are properly oriented relative to one another. The relative angular orientation of the inboard yokes which are secured to the two ends of the steering shaft assembly is referred to as the phase angle. For example, let it be assumed that the inboard yokes of the two universal joints are aligned with one another (i.e., the axes of rotation defined by the respective pairs of cross bores formed through the associated yoke arms are parallel). This arrangement is referred to as a zero phase angle between the two universal joints. Further, let it be assumed that the plane defined by the first outboard yoke and the steering shaft assembly is common with the plane defined by the second outboard yoke and the steering shaft assembly. Lastly, let it be assumed that the outboard yokes extend at operating angles relative to the steering shaft assembly which are equal and opposite to one another. In this instance, the equivalent operating angle of the system is zero because the torsional vibrations generated by the first universal joint are equal and opposite (i.e., 180° out of phase) to the torsional vibrations generated by the second universal joint. As a result, the torsional vibrations generated by the first universal joint are substantially canceled by the equal and opposite torsional vibrations generated by the second universal joint.

Unfortunately, the design of the vehicle in which the steering shaft assembly is installed dictates the directions in which the outboard yokes extend from the steering shaft assembly. Frequently, the outboard yokes do not extend in a common plane or at angles which are equal and opposite to one another. On the contrary, it is common not only that the two outboard yokes extend in different planes, but also that they extend at different operating angles. To accommodate this structure, while still providing some mutual cancellation of the undesired torsional vibrations, it is known to orient the two inboard yokes of the two universal joints at a non-zero phase angle (i.e., the axes defined by the respective pairs of cross bores are not parallel). This angular misalignment provides, in many instances, sufficient mutual cancellation of the sinusoidal variations to eliminate the annoying torsional vibrations during normal use.

One problem which has been encountered in the design and manufacture of vehicle steering shaft assemblies is that it is sometimes difficult to interpret what the desired phase angle relationship is from drawings which have been generated to illustrate the structure of the steering shaft assembly. In some instances, the standards used by a vehicle manufacturer may be different from the standards used by the supplier of the steering shaft assembly. In other instances, the standards used by the designer of the steering shaft assembly may be different from the manufacturer of the steering shaft assembly. Because of these difficulties, it would be desirable to provide a fixture which clearly and unambiguously identifies the phase angle relationships between the universal joints secured to the ends of a steering shaft assembly.

SUMMARY OF THE INVENTION

This invention relates to a fixture which clearly and unambiguously identifies the phase angle relationships between the universal joints secured to the ends of a steering shaft assembly. The fixture includes a first universal joint assembly and a second universal joint assembly which are connected together by a shaft assembly. The shaft assembly includes a male splitted member which is secured, such as by welding, to a first inboard yoke of the first universal joint assembly. The male splined member extends within and cooperates with a female splined member of the shaft assembly. The shaft assembly also includes a hollow cylindrical extension member having a first end which is secured, such as by welding, to a second inboard yoke of the second universal joint assembly. The extension member has a second end which is journalled on a reduced diameter end portion of the female splined member. Thus, the extension member and the second universal joint can be rotated relative to the female splined member and the first universal joint assembly. A band is provided on the outer surface of the female splined member at the end adjacent to the reduced diameter portion and the extension member. The band has a series of indicia which are visible throughout the entire outer surface of the female splined member. A 0° reference point of the indicia is axially aligned with the first inboard yoke of the first universal joint assembly. A reference arrow is provided on the outer surface of the extension member at the end adjacent to the extension member. The reference arrow terminates in a point which is directly adjacent to the indicia. The reference arrow is axially aligned with the second inboard yoke of the second universal joint assembly. The indicia and the reference arrow cooperate to provide a clear and unambiguous indication of the precise phase angle between the first universal joint assembly and the second universal joint assembly.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
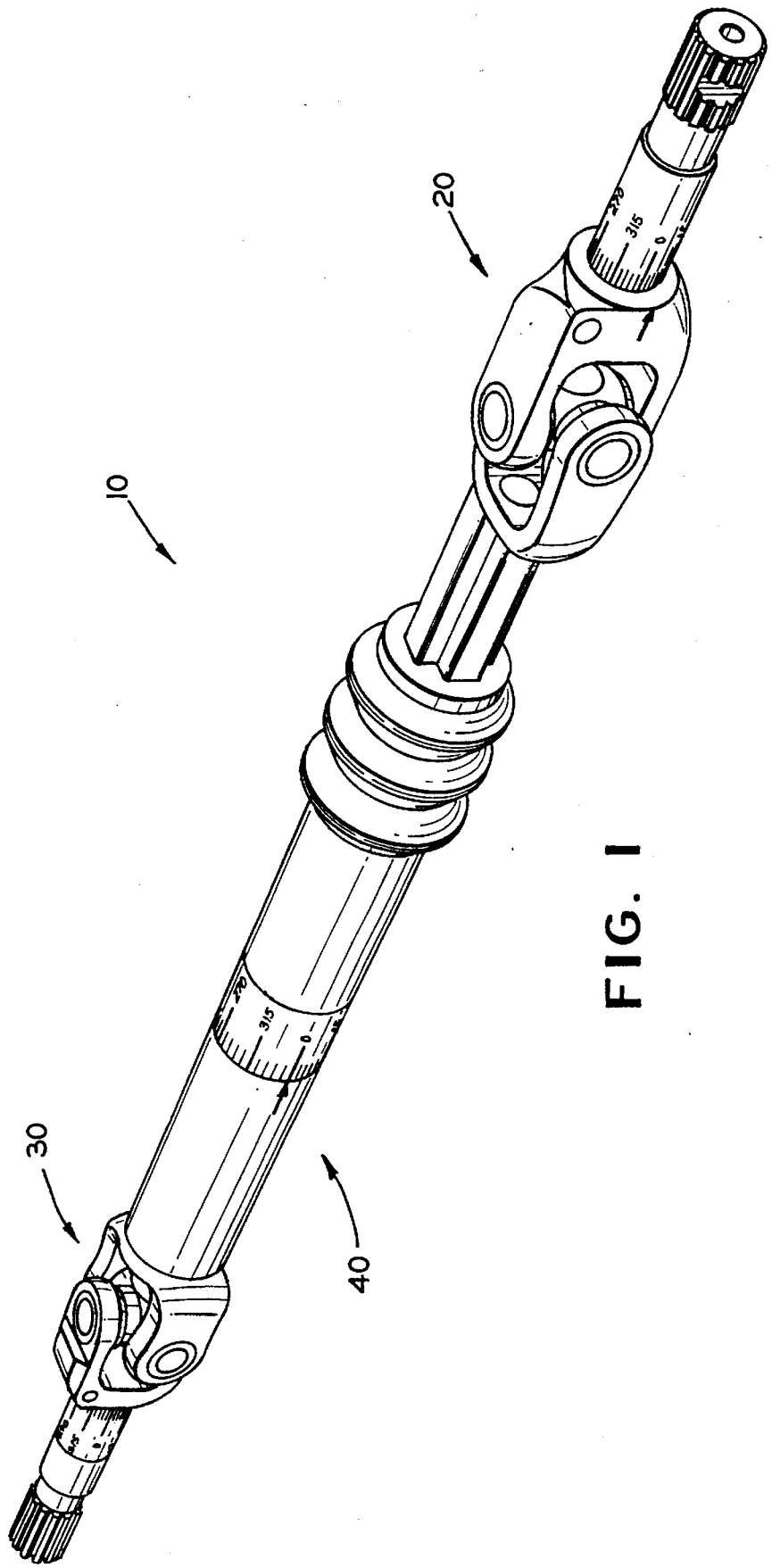
FIG. 1 is a perspective view of a fixture for identifying the phase angle relationships between a pair of universal joints secured to the ends of a vehicle steering shaft assembly in accordance with this invention, wherein the fixture is shown in an extended condition.

Referring now to the drawings, there is illustrated in FIG. 1 a fixture, indicated generally at 10, for identifying the phase angle relationships between a pair of universal joints secured to the ends of a vehicle intermediate steering shaft assembly in accordance with this invention. The fixture 10, which is designed to simulate the structure of an intermediate steering shaft assembly, includes a first universal joint assembly, indicated generally at 20. The first universal joint assembly 20 includes a cross 21 having a central body portion. A conventional lubrication fitting 22 is mounted on the body portion of the cross 21. The lubrication fitting 22 provides one way fluid communication into an internal chamber (not shown) formed within the body portion of the cross 21. The cross 21 further includes four cylindrical trunnions (not shown) which extend radially outwardly from the body portion of the cross 21 in a common plane at right angles relative to one another. An internal passageway (not shown) is formed through each of the trunnions. The internal passageways communicate with the internal chamber formed in the body portion of the cross 21. As a result, lubricant injected through the lubrication fitting 22 passes through the internal chamber into each of the internal passageways, as is well known in the art. Each of the trunnions is generally cylindrical in shape. A bearing cup 24 is mounted on the end of each of the trunnions. Each of the bearing cups 24 is generally hollow and cylindrical in shape. In a manner which is well known in the art, the bearing cups 24 are supported on the ends of the trunnions for relative rotational movement.

The first universal joint assembly 20 also includes a first inboard yoke 25. The first inboard yoke 25 includes a body portion having a pair of opposed arms 26 extending outwardly therefrom. Each of the opposed arms 26 has a cylindrical bore 26a formed therein. The bores 26a are aligned with one another. When the cross 21 is assembled with the first inboard yoke 25, the bearing cups 24 mounted on two opposed trunnions of the cross 21 are received in the bores 26a formed through the opposed arms 26 of the first inboard yoke 25. The bearing cups 24 are retained within the bores 26a by any conventional means.

The first universal joint assembly 20 further includes a first outboard yoke 27. The first outboard yoke 27 includes a body portion having a pair of opposed arms 28 extending outwardly therefrom. Each of the opposed arms 28 has a cylindrical bore 28a formed therein. The bores 28a are aligned with one another. When the cross 21 is assembled with the first outboard yoke 27, the bearing cups 24 mounted on two opposed trunnions of the cross 21 are received in the bores 28a formed through the opposed arms 28 of the first inboard yoke 27. The bearing cups 24 are retained within the bores 28a by any conventional means. A first connecting shaft 29 is secured to the first outboard yoke 27 by any conventional means. In the illustrated embodiment, the body portion of the first outboard yoke 27 has a saw slot formed through one side thereof to an axial opening. The first connecting shaft 29 has a first end which extends into the axial opening and is frictionally retained therein. The first connecting shaft 29 has a second end which extends axially from the first outboard yoke 27 and terminates in a splined outer surface 29a. A transverse notch or recess 29b is formed in the splined outer surface 29a of the first connecting shaft 29 for a purpose which will be explained below. A set screw 29c extends through a threaded aperture (not shown) formed through the first outboard yoke 27 to releasably engage the first connecting shaft 29 and prevent relative movement therebetween.

The fixture 10 also includes second universal joint assembly, indicated generally at 30. The second universal joint assembly 30 includes a cross 31 having a central body portion. A conventional lubrication fitting 32 is mounted on the body portion of the cross 31 for the same purpose as the lubrication fitting 22 described above. The cross 31 further includes four cylindrical trunnions 33 which extend radially outwardly from the body potion of the cross 31 in a common plane at right angles relative to one another. Each of the trunnions 33 is generally cylindrical in shape. A bearing cup 34 is mounted on the end of each of the trunnions 33. The bearing cups 34 are generally hollow and cylindrical in shape and are supported on the ends of the trunnions 33 for relative rotational movement in a manner which is well known in the art.

The second universal joint assembly 30 also includes a second inboard yoke 35. The second inboard yoke 35 includes a body portion having a pair of opposed arms 36 extending outwardly therefrom. Each of the opposed arms 36 has a cylindrical bore 36a formed therein. The bores 36a are aligned with one another. When the cross 31 is assembled with the second inboard yoke 35, the bearing cups 34 mounted on two opposed trunnions 33 of the cross 31 are received in the bores 36a formed through the opposed arms 36 of the second inboard yoke 35. The beating cups 34 are retained within the bores 36a by any conventional means.

The second universal joint assembly 30 further includes a second outboard yoke 37. The second outboard yoke 37 includes a body portion having a pair of opposed arms 38 extending outwardly therefrom. Each of the opposed arms 38 has a cylindrical bore 38a formed therein. The bores 38a are aligned with one another. When the cross 31 is assembled with the second outboard yoke 37, the bearing cups 34 mounted on two opposed trunnions 33 of the cross 31 are received in the bores 38a formed through the opposed arms 38 of the second inboard yoke 37. The beating cups 34 are retained within the bores 38a by any conventional means. A second connecting shaft 39 is secured to the second outboard yoke 37 by any conventional means. In the illustrated embodiment, the body portion of the second outboard yoke 37 has a saw slot formed through one side thereof to an axial opening. The second connecting shaft 39 has a first end which extends into the axial opening and is frictionally retained therein. The second connecting shaft 39 has a second end which extends axially from the second outboard yoke 37 and terminates in a splined outer surface 39a. A transverse notch or recess 39b is formed in the splined outer surface 39a of the second connecting shaft 39 for a purpose which will be explained below. A set screw 39c extends through a threaded aperture (not shown) formed through the second outboard yoke 37 to releasably engage the second connecting shaft 39 and prevent relative movement therebetween.

Figure 3:
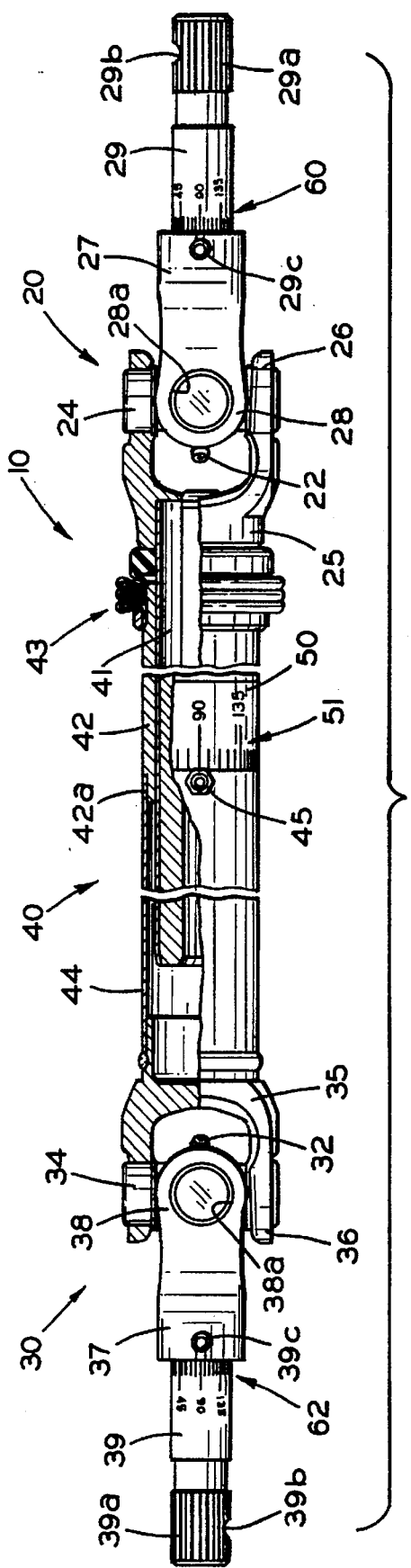
FIG. 3 is a fragmentary bottom plan view, partially in cross section, of the fixture illustrated in FIG. 2.

The fixture 10 further includes a shaft assembly, indicated generally at 40, which extends between the first and second universal joint assemblies 20 and 30, respectively. The shaft assembly 40 includes a male splined member 41 which is secured, such as by welding, to the first inboard yoke 25 of the first universal joint assembly 20. The male splined member 41 extends within and cooperates with a female splined member 42 of the shaft assembly 40. The illustrated male splined member 41 is a conventional four bar spline which is commonly used in steering shaft assemblies of this type. However, it will be appreciated that the male and female members 41 and 42 may be embodied as other structures which provide a rotational driving connection, yet which permit relative axial movement. The junction between the male and female members 41 and 42 is protectively covered by a conventional boot and seal assembly, indicated generally at 43. The opposite end of the female splined member 42 terminates in a reduced diameter portion 42a (see FIG. 3).

The shaft assembly 40 also includes a hollow cylindrical extension member 44 having a first end which is secured, such as by welding, to the second inboard yoke 35 of the second universal joint assembly 30. The extension member 44 has a second end which is journalled on the reduced diameter portion 42a of the female splined member 42. Thus, the extension member 44 (and the second universal joint 30 secured thereto) can be rotated relative to the female splined member 42 (and the first universal joint assembly 20 secured thereto). A set screw 45 extends through a threaded aperture (not shown) formed through the extension member 44 to releasably engage the female splined member 42 and prevent relative movement therebetween.

Figure 2:
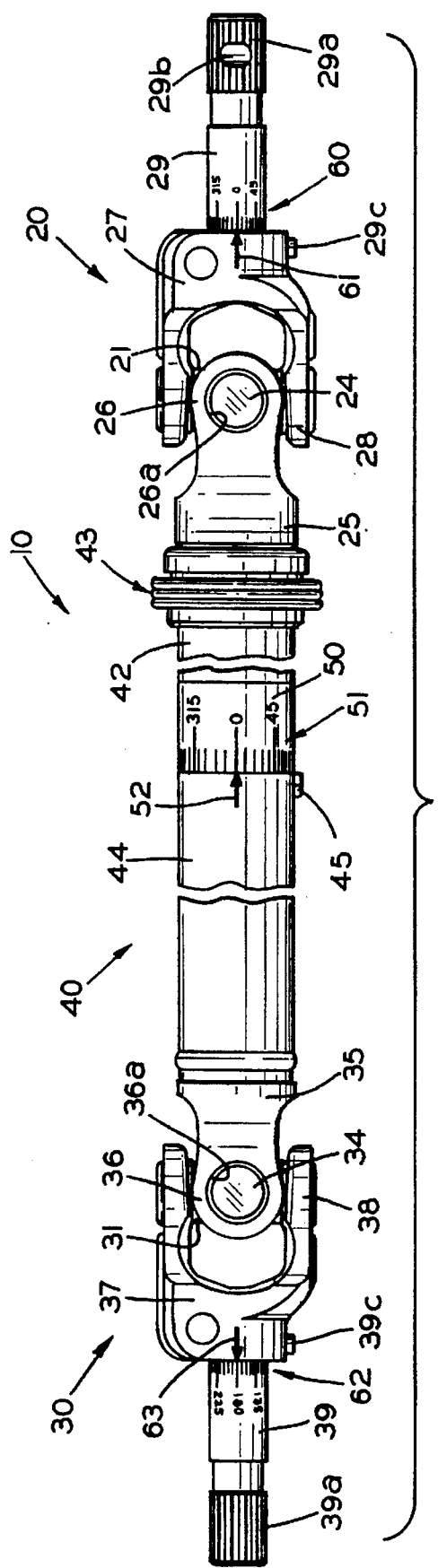
FIG. 2 is a fragmentary side elevational view of a portion of the fixture illustrated in FIG. 1, wherein the fixture is shown in a retracted condition.

A band 50 is provided on the outer surface of the female splined member 42 at the end adjacent to the reduced diameter portion 42a and the extension member 44. The band 50 has a series of indicia, indicated generally at 51, which are visible throughout the entire outer surface of the female splined member 42. In the illustrated embodiment, the indicia 51 is a series of circumferentially spaced, axially extending lines which correspond to the circumferential orientation of each position on the outer surface of the female splined member 42 relative to a reference point. The reference point in the illustrated band 50 is identified as 0°, and each indicia represents a circumferential orientation relative to the 0° reference point. As best shown in FIG. 2, the 0° reference point is axially aligned with the first inboard yoke 25 of the first universal joint assembly 20. In other words, the 0° reference point lies on an axially extending plane which intersects the axis of rotation defined by the aligned bores 26a formed through the yoke arms 26 of the first inboard yoke 25.

A reference arrow 52 is provided on the outer surface of the extension member 44 at the end adjacent to the extension member 44. The reference arrow 52 terminates in a point which is directly adjacent to the indicia 51 provided on the band 50. As best shown in FIG. 2, the reference arrow 52 is axially aligned with the second inboard yoke 35 of the second universal joint assembly 30. In other words, the reference arrow 52 lies on an axially extending plane which intersects the axis of rotation defined by the aligned bores 36a formed through the yoke arms 36 of the second inboard yoke 35.

Thus, when the reference arrow 52 is aligned with the 0° reference point of the indicia 51, the inboard yokes 25 and 35 are aligned with one another (i.e., the axes of rotation defined by the respective pairs of bores 26a are parallel). This arrangement is referred to as a zero phase angle between the first and second universal joint assemblies 20 and 30, as discussed above. Because of the journaled connection between the female splined member 42 and the extension member 44, the first universal joint assembly 20 can be rotated relative to the second universal joint assembly 30. When this occurs, the reference arrow 52 will be aligned with indicia 51 to indicate the precise angular displacement of the first universal joint assembly 20 relative to the second universal joint assembly 30.

It will be appreciated, therefore, that the indicia 51 and the reference arrow 52 cooperate to provide a clear and unambiguous indication of the precise phase angle between the first universal joint assembly 20 and the second universal joint assembly 30. The fixture 10 as a whole can be used as a standard model for defining the phase angle between the universal joints in a steering shaft assembly having a similar structure.

In the illustrated embodiment, the band 50 is formed from a strip of flexible material, such as paper, having the indicia 51 printed thereon. The illustrated band 50 is adhered to the outer surface of the female splined member 42 and covered with a transparent protective material. However, it will be appreciated that the indicia 51 may be provided on the outer surface of the female splined member 42 in any manner, such as being formed directly therein. Similarly, the illustrated reference arrow 52 is formed directly in the outer surface of the extension member 44, but can be otherwise provided thereon. The indicia 51 and the reference arrow 52 may be reversed such that the indicia 51 is provided on the extension member 44 and the reference arrow 52 is provided on the female splined member 42. Alternatively, other markings beyond the illustrated indicia 51 and the reference arrow 52 may be provided if desired.

Referring back to FIGS. 2 and 3, it can be seen that a series of indicia 60 are provided on the outer surface of the first connecting shaft 29 at the end adjacent to the first outboard yoke 27. The series of indicia 60 are similar to the series of indicia 50 discussed above. The reference point in the indicia 60 provided on the first connecting shaft 29 is identified as 0° and is axially aligned with axial center of the notch or slot 29b formed in the end thereof. A reference arrow 61 is provided on the outer surface of the first outboard yoke 27 adjacent indicia 60. As best shown in FIG. 2, the reference arrow 61 is transversely aligned with the first outboard yoke 27. Thus, when the reference arrow 61 is aligned with the 0° reference point of the indicia 60, the notch or slot 29b is transversely aligned with the first outboard yoke 27. However, the first connecting shaft 29 can be rotated relative to the first outboard yoke 27. When this occurs, the reference arrow 61 will be aligned with indicia 60 to indicate the precise angular displacement thereof.

Similarly, a series of indicia 62 are provided on the outer surface of the second connecting shaft 39 at the end adjacent to the second outboard yoke 37. The series of indicia 62 are similar to the series of indicia 60 discussed above. The reference point in the indicia 62 provided on the second connecting shaft 39 is identified as 0° and is axially aligned with axial center of the notch or slot 39b formed in the end thereof. A reference arrow 63 is provided on the outer surface of the second outboard yoke 37 adjacent indicia 62. As best shown in FIG. 2, the reference arrow 63 is transversely aligned with the second outboard yoke 37. Thus, when the reference arrow 63 is aligned with the 0° reference point of the indicia 62, the notch or slot 39b is transversely aligned with the second outboard yoke 37. However, the second connecting shaft 39 can be rotated relative to the second outboard yoke 37. When this occurs, the reference arrow 63 will be aligned with indicia 62 to indicate the precise angular displacement thereof.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A fixture for identifying the relative angular orientation of two end fittings secured to the two ends of a shaft assembly comprising:

a shaft assembly having a first member and a second member, said second member extending co-axially from said first member and being rotatably mounted on said first member for relative rotational movement therebetween;

a first end fitting secured to said first member, said first end fitting having a first reference point which defines an angular orientation of said first end fitting on said first member of said shaft assembly;

a second end fitting secured to said second member, said second end fitting having a second reference point which defines an angular orientation of said second end fitting; on said second member of said shaft assembly; and cooperating indicia provided on said first member and said second member which cooperate to provide an indication of the relative angular orientation between said first end fitting and said second end fitting based on said first reference point and said second reference point.

2. The fixture defined in claim 1 wherein said cooperating indicia is comprised of a third reference point and a series of circumferentially spaced, axially extending fourth reference points, said first reference point being provided on one of said first member or said second member and being located directly adjacent the other of said first member or said second member, said series of fourth reference points being provided on the other of said first member or said second member and being located directly adjacent said first reference point.

3. The fixture defined in claim 2 wherein said series of fourth reference points correspond to a circumferential position on an outer surface of the other of said first member or said second member which ranges between 0° to 360°.

4. The fixture defined in claim 3 wherein said 0° position fourth reference point lies on an axially extending plane which intersects said first reference point when said series of fourth reference points is positioned on said first member or which intersects said second reference point when said series of fourth reference points is positioned on said second member and wherein said third reference point lies on an axially extending plane which intersects said first reference point when said third reference line is positioned on said first member or which intersects said second reference point when said third reference point is positioned on said second member.

5. The fixture defined in claim 1 wherein said first end fitting is a first yoke for use in a first universal joint, said second end fitting is a second yoke for use in a second universal joint, said first yoke and said second yoke each being comprised of a body portion having a pair of opposed arms extending outwardly therefrom, each of opposed arms having a bore formed therein, said bores in said pair of opposed arms of said first yoke being aligned and defining an first yoke axis of rotation, said bores in said pair of opposed arms of said second yoke being aligned and defining a second yoke axis of rotation wherein said first yoke axis of rotation is said first reference point, and said second yoke axis of rotation is said second reference point.

6. The fixture defined in claim 5 wherein said cooperating indicia is comprised of a third reference point and a series of circumferentially spaced, axially extending fourth reference points, said third reference point being provided on one of said first member or said second member and being located directly adjacent the other of said first member or said second member, said series of fourth reference points being provided on the other of said first member or said second member and being located directly adjacent said first reference point.

7. The fixture defined in claim 6 wherein said series of fourth reference points correspond to a circumferential position on an outer surface of the other of said first member or said second member which ranges between 0° to 360°.

8. The fixture defined in claim 7 wherein said 0° position fourth reference point lies on an axially extending plane which intersects said first yoke axis of rotation when said series of fourth reference points is positioned on said first member or which intersects said second yoke axis of rotation when said series of fourth reference points is positioned on said second member and wherein said third reference point lies on an axially extending plane which intersects said first yoke axis of rotation when said third reference line is positioned on said first member or which intersects said second yoke axis of rotation when said third reference point is positioned on said second member.

9. The fixture defined in claim 1 wherein said shaft assembly further includes a third member operatively connected between said first member and said second member, said third member being non-rotatably connected but axially movable with respect to and said first member, and said third member being rotatably connected to said second member such that said second member and said second end fitting can be rotated relative to said third member, said first member and said first end fitting.

10. The fixture defined in claim 1 wherein said second member has an aperture therein for receiving a fastener, said fastener extending through said aperture to releasably engage said first member and prevent relative rotational movement therebetween.

11. A fixture for identifying the relative angular orientation between an end fitting secured to one end of a shaft and a connecting structure located on the opposite end of the shaft, said fixture comprising:

a shaft having a first end and a second end; said second end including a connecting structure for securing a device thereto;

an end fitting rotatably connected to said first end of said shaft, said end fitting having a first reference point which defines an angular orientation of said end fitting on said shaft, said second end of said shaft having a second reference point which defines an angular orientation of said connecting structure on said shaft;

cooperating indicia provided on said shaft and said end fitting which provides an indication of the relative angular orientation between said end fitting and said connecting structure based on said first and second reference points.

12. The fixture defined in claim 11 wherein said cooperating indicia is comprised of a third reference point provided on said end fitting and a series of circumferentially spaced, axially extending fourth reference points provided on said shaft: and located directly adjacent said third reference point.

13. The fixture defined in claim 12 wherein said series of fourth reference points correspond to a circumferential position on an outer surface of said shaft which ranges between 0° to 360°.

14. The fixture defined in claim 13 wherein said end fitting is a yoke for use in a universal joint, said yoke including a body portion having a pair of opposed arms extending outwardly therefrom, each of said opposed axis having a bore formed therein, said bores in said pair of opposed arms being aligned and defining a yoke axis of rotation wherein said yoke axis of rotation is said first reference line, said third reference line lies on an axially extending plane which intersects said yoke axis of rotation and said 0° position fourth reference line lies on an axially extending plane which intersects said second reference point of said connecting structure located on said shaft.

15. The fixture defined in claim 11 wherein said end fitting has an aperture therein for receiving a fastener, said fastener extending through said aperture to releasably engage said shaft and prevent relative rotational movement therebetween.

16. A fixture for identifying the phase angle relationships in a steering shaft assembly, said fixture comprising:

a first universal joint assembly;

a second universal joint assembly;

a main shaft assembly extending between said first universal joint and said second universal joint, said main shaft assembly including a first member secured to said first universal joint and a second member secured to said second universal joint assembly, said second member extending co-axially from said first member and being rotatably mounted on said first member for relative rotational movement therebetween, said first universal joint having a first reference point which defines an angular orientation of said first universal joint on said first member, and said second universal joint having a second reference point which defines an angular orientation of said second universal joint on said second member;

first cooperating indicia provided on said first member and said second member which cooperate to provide an indication of the relative phase angle orientation between said first universal joint and said second universal joint based on said first reference point and said second reference point;

a first connecting shaft having a first end which is rotatably secured within said first universal joint and a second end including a first connecting structure for securing a device thereto, said second end of said first connecting shaft further having a third reference point which defines an angular orientation of said connecting structure on said connecting shaft; and second cooperating indicia provided on said first universal joint and said first connecting shaft which provides an indication of the relative phase angle orientation between said first universal joint and said connecting structure based on said first reference point and said third reference point.

17. The fixture defined in claim 16 wherein said first cooperating indicia is comprised of a fourth reference point and a series of circumferentially spaced, axially extending fifth reference points, said fourth reference point being provided on one of said first member or said second member and being located directly adjacent the other of said first member or said second member, said series of fifth reference points being provided on the other of said first member or said second member and being located directly adjacent said first reference point, and wherein said second cooperating indicia is comprised of a sixth reference point provided on said first universal joint and a series of circumferentially spaced, axially extending seventh reference points provided on said connecting shaft and located directly adjacent said sixth reference point.

18. The fixture defined in claim 17 wherein said series of fifth reference points corresponds to a circumferential position on an outer surface of the other of said first member or said second member which ranges between 0° to 360° and said series of seventh reference points corresponds to a circumferential position on an outer surface of said first connecting shaft which ranges between 0° to 360°.

19. The fixture defined in claim 16 which further includes a second connecting shaft having a first end which is rotatably secured within said second universal joint and a second end including a connecting structure for securing a device thereto, said second end of said second connecting shaft further having a eighth reference point which defines an angular orientation of said connecting structure on said second connecting shaft; and third cooperating indicia provided on said second universal joint and said second connecting shaft which provides an indication of the relative phase angle orientation between said second universal joint and said second connecting structure based on said second reference point and said eighth reference point.

* * * * *